(12) United States Patent
Ramsbottom et al.

(10) Patent No.: US 6,508,761 B1
(45) Date of Patent: Jan. 21, 2003

(54) MONOCULAR BORESCOPE OR ENDOSCOPE WITH OFFSET MASK

(75) Inventors: Andrew Paul Ramsbottom, Westcliff on Sea (GB); Philip Michael Coath, Hockley (GB)

(73) Assignee: Keymed (Medical & Industrial Equipment) Ltd., Southend-on-Sea (GB)

(*) Notice: Subject to any disclaimer, the term of this patent is extended or adjusted under 35 U.S.C. 154(b) by 63 days.

(21) Appl. No.: 09/787,124

(22) PCT Filed: Jul. 27, 2000

(86) PCT No.: PCT/GB00/02883

§ 371 (c)(1), (2), (4) Date: Mar. 14, 2001

(87) PCT Pub. No.: WO01/06912

PCT Pub. Date: Feb. 1, 2001

(30) Foreign Application Priority Data

Jul. 28, 1999 (GB) .............................................. 9917716

(51) Int. Cl.[7] .............................................. A61B 1/002
(52) U.S. Cl. ........................ 600/181; 600/138; 600/162; 600/171; 600/173
(58) Field of Search ................................ 600/138, 162, 600/171, 173, 181; 359/738–740

(56) References Cited

U.S. PATENT DOCUMENTS

| 4,838,247 A | 6/1989 | Forkner |
| 5,459,605 A | 10/1995 | Kempf |
| 5,540,650 A | 7/1996 | Smith |
| 5,577,991 A | 11/1996 | Akui et al. |
| 5,588,948 A | * 12/1996 | Takahashi et al. ............ 348/45 |

FOREIGN PATENT DOCUMENTS

| EP | 636915 | 2/1995 | |
| JP | 10-146312 | * 6/1998 | ............ A61B/1/00 |
| WO | WO 9413189 | 6/1994 | |

* cited by examiner

Primary Examiner—John Mulcahy
(74) Attorney, Agent, or Firm—Smith, Gambrell & Russell

(57) ABSTRACT

A monocular borescope or endoscope is provided with an image relaying means (16) defining a longitudinal axis (L)(and with a viewing means comprising an ocular lens (20) and field mask (18) defining a central axis (C) which is parallel to and offset from the longitudinal axis (L). In one embodiment the ocular lens (20) is coincident with the central axis (C) of the mask (18), while in another embodiment the ocular lens (20) is coincident with the longitudinal axis (L). The mask (18) is arranged to be mountable in a number of different rotational orientations each providing a different offset between the longitudinal axis (L) and the central axis (C).

11 Claims, 5 Drawing Sheets

MONOCULAR BORESCOPE OR ENDOSCOPE WITH OFFSET MASK

The present invention relates to rigid monocular borescopes and endoscopes which are well known devices for viewing objects at remote or inaccessible locations. The invention in particular relates to means for providing an accurate direction of view in such rigid borescopes and endoscopes.

Although there are many detailed design variations, rigid borescopes and endoscopes generally consist of the basic arrangement shown schematically in FIG. 1. When an object O lies within the scope's field of view (f.o.v.), an image I of the object O is formed within the insertion tube 12 of the scope 10 by means of an objective lens assembly 14. This intermediate image I is then transferred or relayed to the proximal end of the scope 10 by a series of relay lenses 16 to form a final intermediate image superimposed on a field mask 18. The purpose of the field mask 18 is to provide a sharp, well-defined edge to the specified field of view. Finally an ocular lens system 20 then projects this final image to form a virtual image some distance away, say about 1 m, so as to present a comfortable view to the eye E (a normal, unaided eye can generally focus comfortably on objects from a distance of about 25 cm to infinity). Additionally an adaptor lens attachment (not shown) may be fitted to re-focus this image on to a camera or CCD chip to provide an image of appropriate size for the camera.

The distal end of the scope 10 will generally use a prism arrangement 22 to establish the required direction of view (d.o.v.), unless this is a 0° forward viewer in which case no prism is required. The direction of view is the angle between the longitudinal axis L of the scope 10 and the viewing axis V where the viewing axis is defined as the line bisecting the extreme directions delineating the diametric edges of the visible field of view. The actual direction of view that is achieved in practice may vary from the design specification for a number of reasons:

the prism 22 may not be set at precisely the correct angle
the individual lenses 14, 16 comprising the objective and relay systems may not be manufactured such that the optical and mechanical centres coincide precisely
the individual lenses 14, 16 comprising the objective and relay systems may not be precisely centred or aligned in the lens tube 12

In a borescope or endoscope there may be large numbers of individual lenses and the build up of very slight centring errors of this type may easily result in a shift in the measured d.o.v. outside acceptable limits. The conventional method of controlling this is to place very tight tolerances on the items listed above in order to ensure the resultant d.o.v. is within the specified limits (typically ±5°). For scopes where the specified tolerance for d.o.v. is particularly tight (e.g. ≦3°) it may not be possible (or would be prohibitively expensive) to control these individual tolerances to the required level of precision. There is therefore a need to achieve a high tolerance d.o.v. without relying on particularly tight individual centration tolerances.

Accordingly, the present invention provides apparatus for use as a monocular borescope or monocular endoscope, comprising a tube having a distal end and a proximal end connected to a housing, a viewing port adjacent a distal end through which an object may be viewed in use, an image relaying means operable to relay an image of the object to a viewing means provided in the housing, the viewing means including an ocular lens and a mask positioned distally of the ocular lens and having an aperture through which the image is viewed, wherein the image relaying means defines a longitudinal axis and the aperture of the mask defines a central axis and wherein the central axis is parallel to and offset from the longitudinal axis.

In a first embodiment, the ocular lens defines a central axis which is coincident with the longitudinal axis.

In a second embodiment, the ocular lens defines a central axis which is coincident with the central axis of the aperture in the mask.

In order to provide the desired offset, the mask may be mounted so as to be adjustable into the correct position. Alternatively, the mask may be moved and replaced with a second mask having the correct offset. However, the current preference is for the mask to be mountable in different rotational orientations each providing a different offset between the longitudinal axis of the image relaying means and the central axis of the mask. Preferably the ocular lens is adjustable together with the mask. This allows the mask to be provided with different offsets, but does not require a selection of different masks to achieve this aim.

The present invention also provides a method of providing a desired direction of view in a monocular borescope or monocular endoscope, the borescope or endoscope comprising a tube having a distal end and a proximal end connected to a housing, a viewing port adjacent to the distal end through which an object may be viewed in use, an image relaying means operable to relay an image of the object to a viewing means provided in the housing, and the viewing means comprising an ocular lens; the method comprising the steps of providing a mask distally of the ocular lens, the mask having an aperture through which the image is viewed and the aperture having a central axis; determining the angular difference between the actual direction of view and the desired direction of view; calculating the amount and direction of offset of the central axis of the mask aperture relative to the longitudinal axis required to achieve the desired direction of view and detaching the mask and fitting a mask having an aperture defining a central axis with the required offset.

The steps of detaching and fitting the mask preferably comprise detaching the mask, rotating the mask to a different rotational orientation with the required offset and fitting the mask into position. Preferably, the ocular lens is rotated together with the mask to the required offset.

The method may further comprise step of replacing the ocular lens with a second lens having a central axis coincident with the central axis of the second mask.

In the method, the amount of offset required may be calculated in accordance with the relationship:

$$\delta = \frac{\alpha \cdot \eta}{\varphi}$$

where $\delta$ is the amount of offset required, $\alpha$ is the angular difference between the actual direction of view and the desired direction of view, $\eta$ is the size of the image at the position of the mask and $\varphi$ is the field of view of the scope.

The invention will now be described in detail, by way of example only, with reference to the accompanying drawings in which:

FIG. 1 shows in schematic form the configuration of a conventional rigid borescope or endoscope and has been discussed above.

As mentioned above the scope 10 has a longitudinal axis L. The field mask 18 is a plate with a circular aperture, the aperture having a central axis C passing through its centre. In the prior art, the central axis C is coincident with the longitudinal axis L. An orbital scanning scope will also have a rotational axis R which is usually coincident with the longitudinal axis L.

Figure 1:
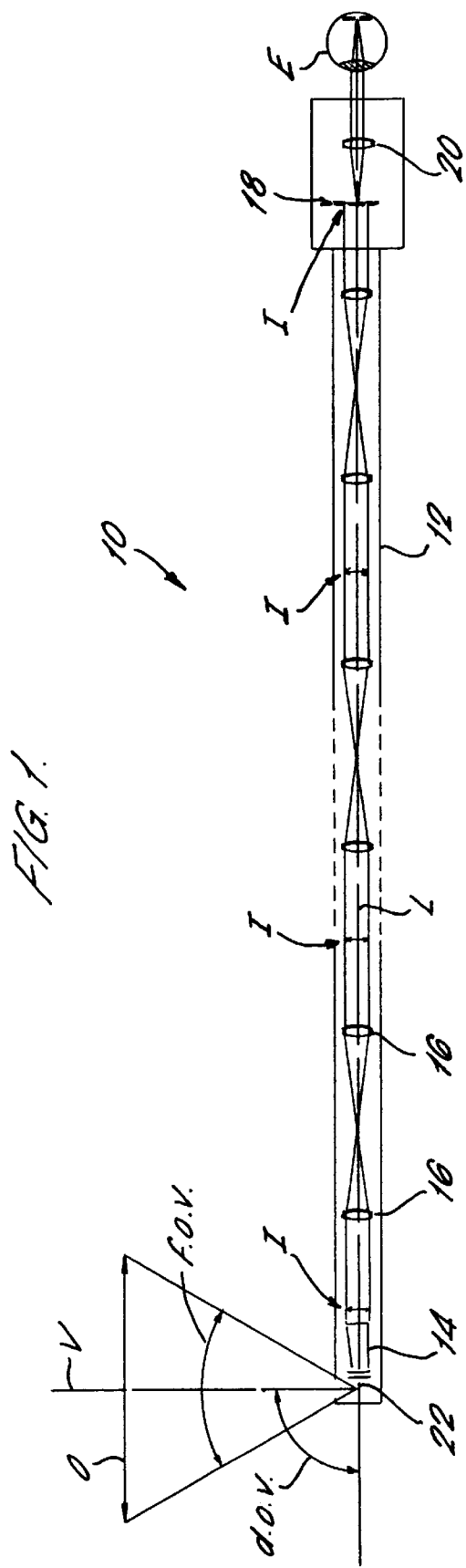
FIG. 1 is a schematic view of a prior art rigid borescope or endoscope.
Figure 2:
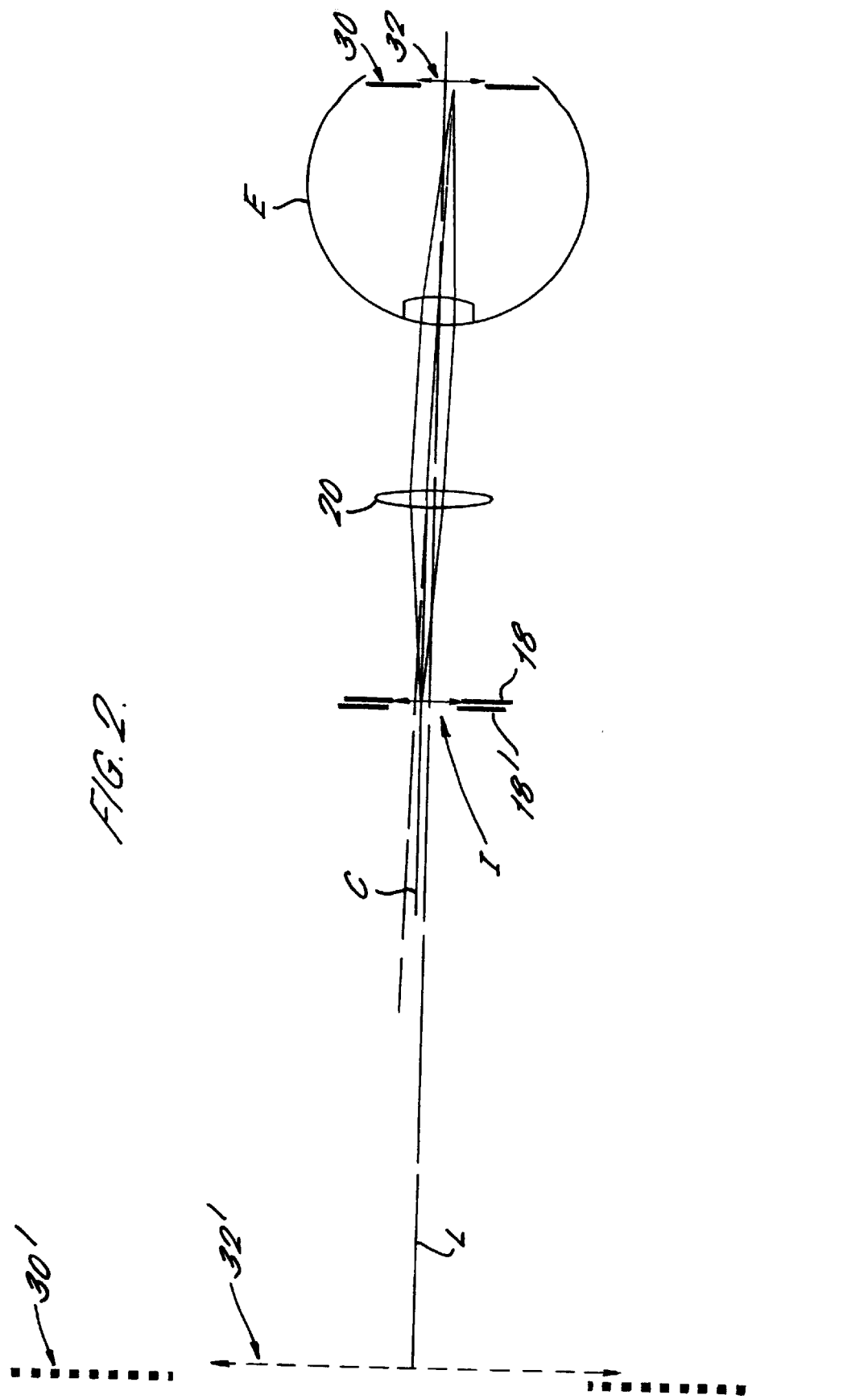
FIG. 2 is a schematic diagram illustrating a first embodiment of the present invention.

A first embodiment of the present invention, for incorporation in a scope of the type shown in FIG. 1, is illustrated schematically in FIG. 2.

In the present invention, the field mask 18' is shifted laterally compared with a conventional field mask 18 (shown for comparison purposes only) so that its central axis C remains parallel to but is no longer coincident with the longitudinal axis L of the scope as a whole. Accordingly, the virtual image 30' of the field mask 18' formed by the ocular lens, and thus the image 30 on the retina of the eye E (or in the camera), are offset laterally from the virtual image 32' of the object and the corresponding image 32 on the retina, respectively. In turn, this shifts the measured direction of view of the scope by a small amount.

In the first embodiment illustrated in FIG. 2, the field mask 18' is positioned in a housing (not shown) at the proximal end of the insertion tube (not shown) such that the central axis C of the aperture will be offset from the longitudinal axis L of the scope 10. This embodiment is entirely suitable for correcting the direction of view in scopes in which there is no orbital scan facility, i.e scopes in which the insertion tube is not rotated about its longitudinal axis.

However, this embodiment is not suitable where orbital scan is required or where the scope 10 is rotated relative to the eye or attached camera. This is because, in offsetting the field mask 18' from the longitudinal axis L of the scope, an offset in the position of the image 30 of the field mask 18' formed on the retina of the eye E (or in the camera etc.) relative to this axis L, and relative to the image 32 of the object on the retina, is also introduced. If the optical system now rotates about its longitudinal axis L the direction of the bundle of rays associated with the centre of the field mask will precess around the longitudinal axis L causing the field mask image position as formed on the retina of the eye or on the CCD chip of a video camera also to move in rotary motion about the longitudinal axis L. This effect will be noticeable when viewing with the naked eye but would be particularly apparent when viewing by means of an attached video camera and could even cause the field mask image to shift off the active area of the CCD chip as the scope rotates.

Figure 3:
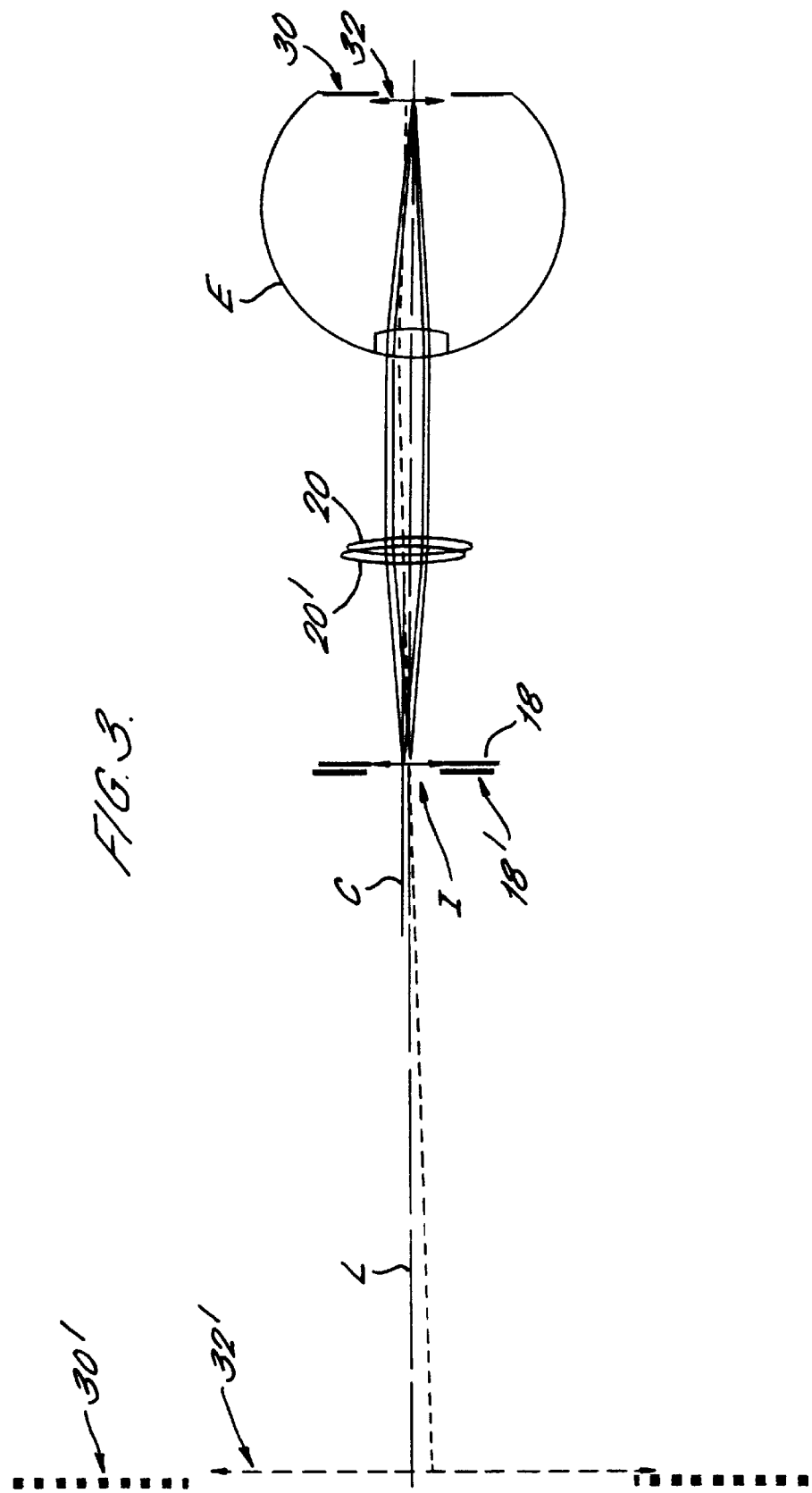
FIG. 3 is a schematic view illustrating a second embodiment of the present invention.

In order to overcome this problem, a second embodiment of the present invention is provided and is illustrated in FIG. 3.

In this second embodiment, both the field mask 18' and ocular lens 20' of the scope 10 are offset from the longitudinal axis L of the scope 10 by the same amount and in the same direction. (A conventional field mask 18 and ocular lens 20 are also shown for comparison purposes only.) This results in a shift in the measured direction of view of the scope 10. However, as the tube 12 is rotated about the longitudinal axis L, although the bundle of light rays associated with the centre of the field mask will shift in position laterally about the longitudinal axis L, their direction does not change and since the ray bundle is substantially parallel, i.e the eye or camera lens is essentially focussed at infinity, this does not give rise to any shift in the position of the field mask image 30 on the retina of the eye or the CCD camera chip as the scope rotates. Accordingly, this embodiment is suitable for orbital scan scopes without resulting in any field mask image movement.

The present invention can be implemented in various ways which are easy to implement in the final stages of scope assembly.

Typically, the actual direction of view of a scope is measured using a standard field mask and ocular assembly with a central axis C coincident with the longitudinal axis L of the scope so as to determine the amount and direction of field mask shift which will be required to give a desired direction of view.

This desired d.o.v may then be provided by selecting an appropriate ocular assembly from a range of assemblies constructed to provide incrementally differing amounts of offset in the position of the field mask 18' and ocular lens 20'. Alternatively, the ocular assembly for each particular scope may be machined such that the internal bore is offset by precisely the amount calculated to achieve the desired direction of view.

As those skilled in the art will appreciate, there is a limit to the amount of direction of view correction which is achievable by this means. If the shift in the field mask position is too great then the image seen within the field mask will start to be clipped by the physical boundaries of the lens tube, prism, relay or objective lenses and so on. The present invention therefore relaxes the centration tolerances on a borescope assembly to within practical limits even though it does not remove them entirely.

The level of offset required in order to provide a given shift in d.o.v. will depend on the particular design of the borescope. In general we can state the following relationship between the required d.o.v. shift $\alpha$, the field of view $\varphi$, the intermediate image size (at the field mask position) $\eta$ and the amount of offset required $\delta$:

$$\delta = \frac{\alpha \cdot \eta}{\varphi}$$

The intermediate image size for a scope is a design parameter selected against a variety of other parameters to achieve particular performance trade-offs. However, it will generally be some fraction $\varepsilon$ of the scope diameter D. Hence the above equation becomes:

$$\delta = \frac{\alpha \cdot \varepsilon \cdot D}{\varphi}$$

This equation is only strictly accurate for a system with zero distortion. However, it serves to indicate the general relationships. It will be noted that to achieve a given shift in d.o.v. the ocular offset required increases with the diameter of the scope, and inversely as the field of view. Typically, in order to achieve a 1° shift in d.o.v. a 6 mm diameter scope covering a 60 degree field of view would require an offset of 0.05 mm. A 10 mm diameter scope covering a 35° field of view would require an ocular offset of 0.19 mm.

Figure 4:
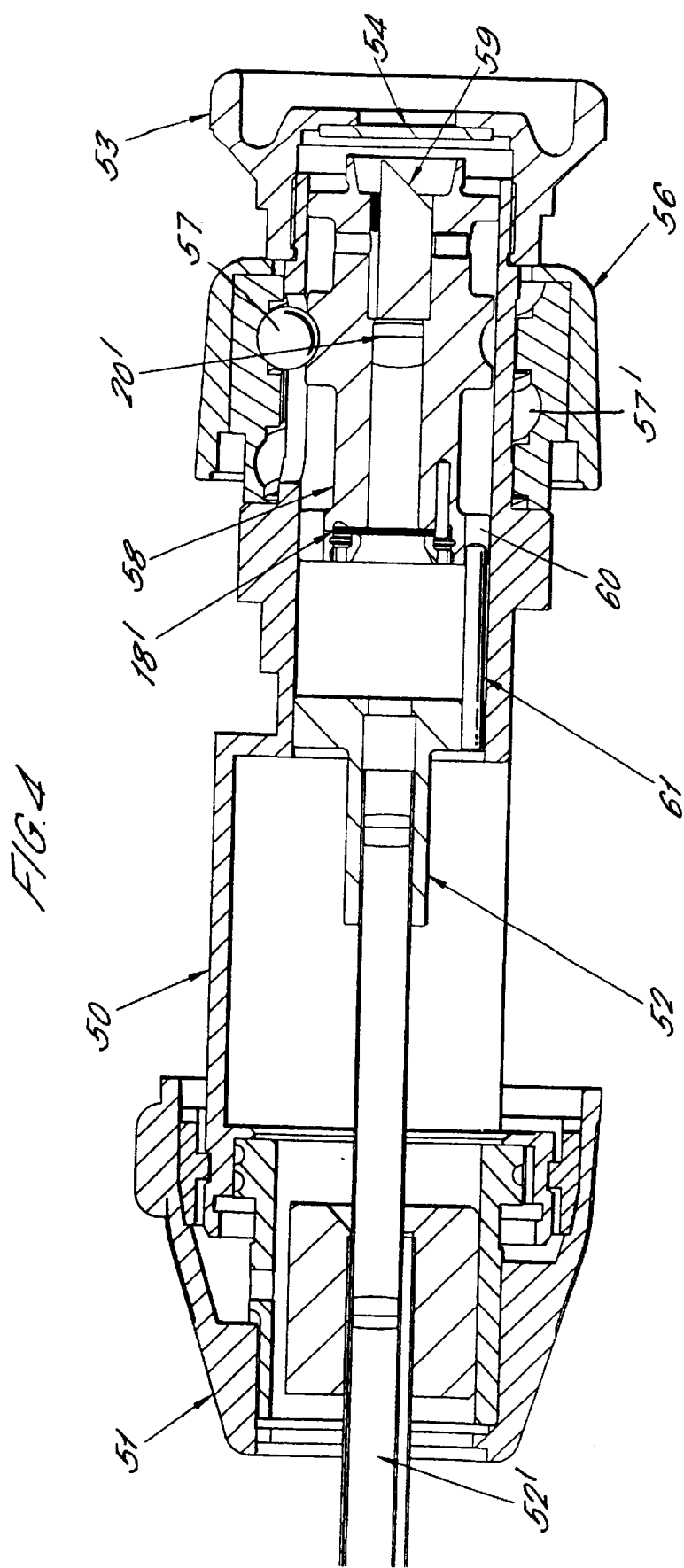
FIG. 4 is a cross section through the proximal end of a borescope with the handle removed for clarity.
Figure 5:
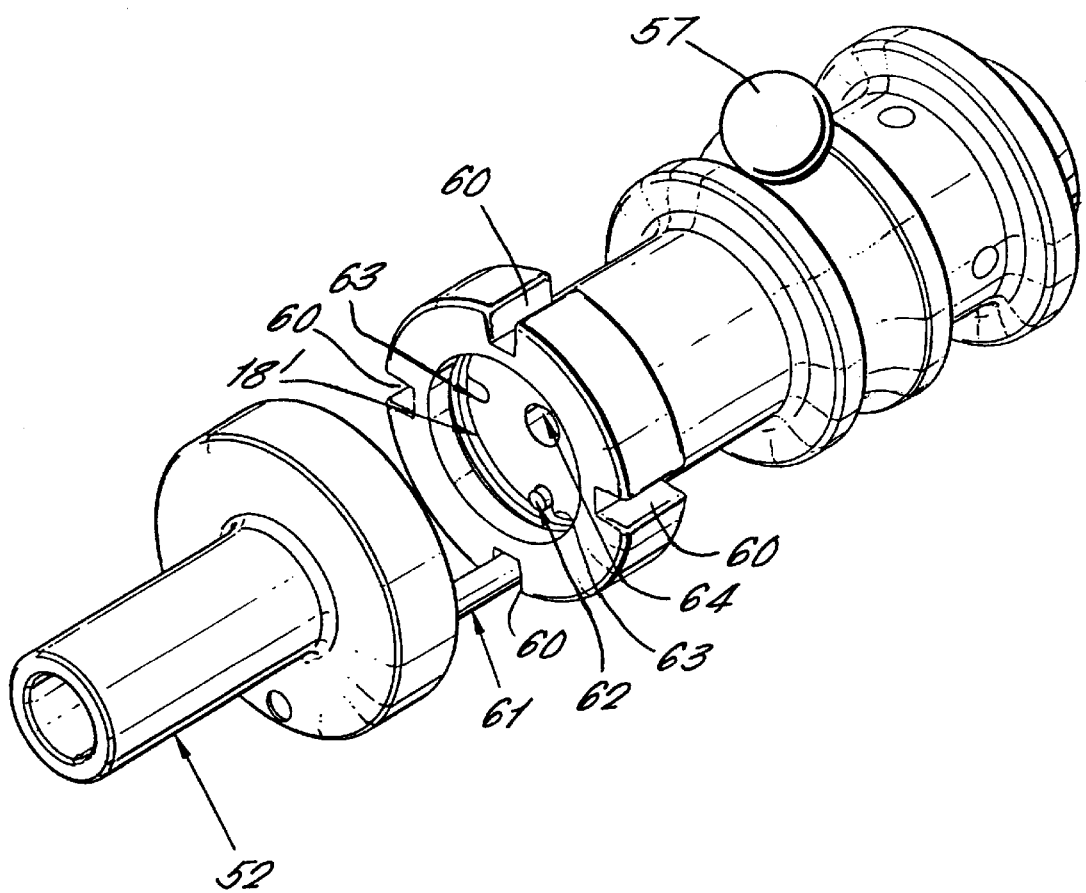
FIG. 5 is a perspective view of the borescope of FIG. 4 with the housing removed.

FIGS. 4 and 5 show a borescope in accordance with the second embodiment in which a single mask assembly can be used to provide a number of different offsets.

Many of the features of the borescope of FIGS. 4 and 5 are conventional and are only described briefly below.

The housing 50 is provided at its distal end with an orbital scan control 51 while a lens tube sleeve 52 extends from the housing and supports a lens system 52' extending to the distal end of the borescope. The viewing means comprises a housing eye piece 53 have a window 54 and a conventional focus control 56 which advances a ball 57 in a helical groove 57' to alter the axial position of ocular body assembly 58.

The ocular body assembly 58 comprises the field mask 18' at its distal end which is adjusted to the correct axial position by means of packing/spacer shims, while a dove prism 59 may optionally be provided at its distal end. The ocular body assembly 58 has four axially extending grooves 60 which equally spaced about its circumference. An orbital scan link pin 61 extends from the lens tube sleeve 52 into one of the grooves 60 to ensure that the lens tube 52 rotates together with the ocular body assembly 58.

As best shown in FIG. 5, the mask 18' is located within the ocular body assembly by means of an alignment pin 62. The mask is provided with four grooves 63 (only two of which are shown in FIG. 5) any one of which can be engaged with the alignment pin 62. A field mask direction of view indicator 64 indicates the orientation of the field mask 18' within the ocular body assembly 58. The field mask 18' is retained in the ocular body assembly 58 by a locking ring (not shown) which engages with the outer peripheral area of the field mask 18'.

When the borescope is being assembled, the degree of offset required of the mask is determined in accordance with the equation given above. The lens tube sleeve 52 is then mounted to the ocular body assembly to give a direction of view in accordance with acceptable limits. Thus, if the offset is determined to be outside of the acceptable limits, the ocular body assembly is rotated to an orientation in which it gives a positive or negative shift in the direction of view. If the offset is within acceptable limits, the ocular body assembly is mounted in a nominal position that just provides a shift in direction of view in a direction normal to the plane containing the longitudinal slope axis and the nominal viewing axis.

Depending upon the relative positions of the lens tube sleeve 52 and ocular body assembly 58, it may also be necessary to change the orientation of the field mask 18' so that the direction of view indicator 63 points in the right direction. It should be noted that as the field mask is mounted so as to be concentric with the ocular lens 20', this rotation of the field mask 18' does not provide any additional offset to the image, but simply changes the position of the direction of view indicator 64.

What is claimed is:

1. Apparatus for use as a monocular borescope or monocular endoscope, comprising a tube having a distal end and a proximal end connected to a housing, a viewing port adjacent a distal end through which an object may be viewed in use, an image relaying means operable to relay an image of the object to a viewing means provided in the housing, the viewing means including an ocular lens and a mask positioned distally of the ocular lens and having an aperture through which the image is viewed, wherein the image relaying means defines a longitudinal axis and the aperture of the mask defines a central axis and wherein the central axis is parallel to and offset from the longitudinal axis.

2. Apparatus as claimed in claim 1, wherein the ocular lens defines a central axis which is coincident with the central axis of the aperture in the mask.

3. Apparatus as claimed in claim 1, wherein the ocular lens defines a central axis which is coincident with the longitudinal axis.

4. Apparatus as claimed in claim 1, wherein the mask is mountable in different rotational orientations each providing a different offset between the longitudinal axis of the image relaying means and the central axis of the mask.

5. Apparatus according to claim 4, wherein the ocular lens is rotatable together with the mask between the different rotational orientations.

6. A method of providing a desired direction of view in a monocular borescope or monocular endoscope, the borescope or endoscope comprising a tube having a distal end and a proximal end connected to a housing, a viewing port adjacent to the distal end through which an object may be viewed in use, an image relaying means operable to relay an image of the object to a viewing means provided in the housing, and the viewing means comprising an ocular lens; the method comprising the steps of providing a mask distally of the ocular lens, the mask having an aperture through which the image is viewed and the aperture having a central axis; determining the angular difference between the actual direction of view and the desired direction of view; calculating the amount and direction of offset of the central axis of the mask aperture relative to the longitudinal axis required to achieve the desired direction of view and detaching the mask and fitting a mask having an aperture defining a central axis with the required offset.

7. A method according to claim 6, wherein the step of detaching and fitting the mask comprises detaching the mask, rotating the mask to a different rotational orientation with the required offset and fitting the mask into position.

8. A method according to claim 7, wherein the ocular lens and mask are coaxial, and the method further comprises rotating the ocular lens to the required offset together with the mask.

9. A method as claimed in claim 6, further comprising the step of replacing the ocular lens with a second lens having a central axis coincident with the central axis of the second mask.

10. A method as claimed in claim 6, wherein the mask has a projection providing a visual indication of its orientation, and the method further comprises rotating the mask on its own about its axis to change the position of the projection.

11. A method as claimed in claim 6, further comprising calculating the amount of offset required in accordance with the relationship;

$$\delta = \frac{\alpha \cdot \eta}{\varphi}$$

where $\delta$ is the amount of offset required, $\alpha$ is the angular difference between the actual direction of view and the desired direction of view, $\eta$ is the size of the image at the position of the mask and $\varphi$ is the field of view of the scope; and positioning the mask at the calculated offset.

* * * * *